United States Patent [19]

Stammreich et al.

[11] Patent Number: 4,743,052
[45] Date of Patent: May 10, 1988

[54] TENSION LATCH ASSEMBLY

[75] Inventors: John C. Stammreich, Rancho Palos Verdes; William R. Bourne, Jr., Anaheim, both of Calif.

[73] Assignee: Rexnord Inc., Brookfield, Wis.

[21] Appl. No.: 822,171

[22] Filed: Jan. 24, 1986

[51] Int. Cl.⁴ .......................... E05C 5/02; E05C 19/14
[52] U.S. Cl. .................................................. 292/113
[58] Field of Search .............. 292/108, 113, 210, 247, 292/DIG. 27, DIG. 31, DIG. 49, DIG. 62

[56] References Cited

U.S. PATENT DOCUMENTS

| | | | |
|---|---|---|---|
| 2,416,889 | 3/1947 | Andrews | 292/173 |
| 2,695,803 | 11/1954 | Summers | 292/113 |
| 2,712,955 | 7/1955 | Andrews | 292/113 |
| 2,714,032 | 7/1955 | Summers | 292/247 |
| 2,894,777 | 7/1959 | Hogan | 242/113 |
| 3,026,133 | 3/1962 | Swanson | 292/113 |
| 3,194,595 | 7/1965 | Wheeler et al. | 292/113 |
| 3,214,207 | 10/1965 | Swanson | 292/66 |
| 3,259,411 | 7/1966 | Griffiths | 292/113 |
| 3,425,727 | 2/1969 | Swanson | 292/110 |
| 3,534,992 | 10/1970 | Swanson | 292/113 |
| 4,053,177 | 10/1977 | Stammreich et al. | 292/113 |
| 4,318,557 | 3/1982 | Bourne et al. | 292/113 |
| 4,531,769 | 7/1985 | Glancy | 292/113 |

FOREIGN PATENT DOCUMENTS 1537410 12/1978 United Kingdom .

OTHER PUBLICATIONS

Catalog Publication—The Hartwell Corporation, copyright 1984, 2 pages.

Primary Examiner—Richard E. Moore

[57] ABSTRACT

A low-profile, over-center tension latch assembly is provided which has a handle (20) which opens fully for inspection or adjustment of the assembly while under load, and which may be indexed into a position with a link mechanism (70) in order to act therewith for releasing a keeper engaging member (50) from engagement with a keeper assembly. The handle (70) is locked in a closed position in a manner which secures it to the link mechanism (70) while trapping the keeper engaging member (50) therebetween. The arrangement of the handle (20), keeper engaging member (50) and link mechanism (70) is such as to allow the assembly to be aerodynamically flush mounted with the surface of the structure in which it is installed. Both the handle (20) and the keeper engaging member (50) are pivotally mounted at an end of the link mechanism which is opposite that end which mounts the link mechanism to the aircraft structure. The keeper engaging member (50) extends over the top of the mounting bushing (74) for a resulting over-center latch which operates within a low-profile envelope.

3 Claims, 2 Drawing Sheets

TENSION LATCH ASSEMBLY

TECHNICAL FIELD

The present invention relates to latch mechanisms used in the aircraft and aerospace industries, and in particular to low-profile, over-center tension latch assemblies.

BACKGROUND

The present invention is an improvement over a variety of prior art low-profile latches which use the over-center concept, i.e. latches which attempt to be low-profile for use in a space demanding a work envelope of significantly reduced dimensions. Such latches, however, have typically been able to provide only limited access for inspection or adjustment while under load. Accessibility is available in other designs but requires a complex structure. The development of new aircraft and space vehicles demands a new type of latch which while providing more than one desirable feature, is also reliable in its performance. Hence the development of the present invention.

SUMMARY OF THE INVENTION

The present invention is a low-profile, over-center tension latch assembly constructed for aerodynamic flush-mounting and cooperation with a keeper assembly to draw two parts of an aircraft or space vehicle together for securement in a rigid relationship. The tension latch assembly of the present invention has a handle, a member which engages a keeper, a mechanism for linking the handle to the keeper engaging member and a mechanism for locking the handle to the linking mechanism when the assembly is in a closed arrangement.

The linking mechanism includes a link and a bushing which are constructed so that the tension latch assembly may be attached to the aircraft or space vehicle. The linking mechanism further includes a cooperating set of elements which allow the handle to be indexed so as to cause simultaneous movement of the link as the handle is rotated into open and closed positions. Both the handle and the keeper engaging member are pivotally secured to the link at one end thereof. Finally a trigger-type mechanism is provided which locks the handle to the link mechanism, forward of the mounting bushing, when the handle is in a closed position. When the handle is locked to the link, the keeper engaging member is positioned and captured between the handle and the mounting bushing.

The foregoing is but a brief summary of the invention. In the description which follows two embodiments of the invention will be described in detail. From the description, it will become clear that the present invention is a significant latch improvement over what is currently known in the prior art. The embodiments will point out that the invention is unique in its securing of the handle to the link at a location forward of the mounting bushing. Further the handle traps the keeper engaging member and prevents the hook member from releasing as a result of vibrational forces acting on the assembly. The invention provides and aerodynamic, flush-mounted design, allowing maximum access for inspection and adjustment of the mechanism while under load, which is not provided by any known over-the-center prior art latches. Additionally, unitary movement of the handle and link when the mechanism is being opened is made possible by a unique indexing feature of the handle. These and other features of the invention are resulting advantages over the prior art will be explored in greater detail hereinafter.

DETAILED DESCRIPTION OF A PREFERRED EMBODIMENT

With reference to the drawings, a preferred embodiment and an alternate embodiment for practicing the present invention will be described. Where appropriate, the same reference numerals will be used throughout the drawings to indicate like elements of the two embodiments.

Figures 1, 1A, 1B:
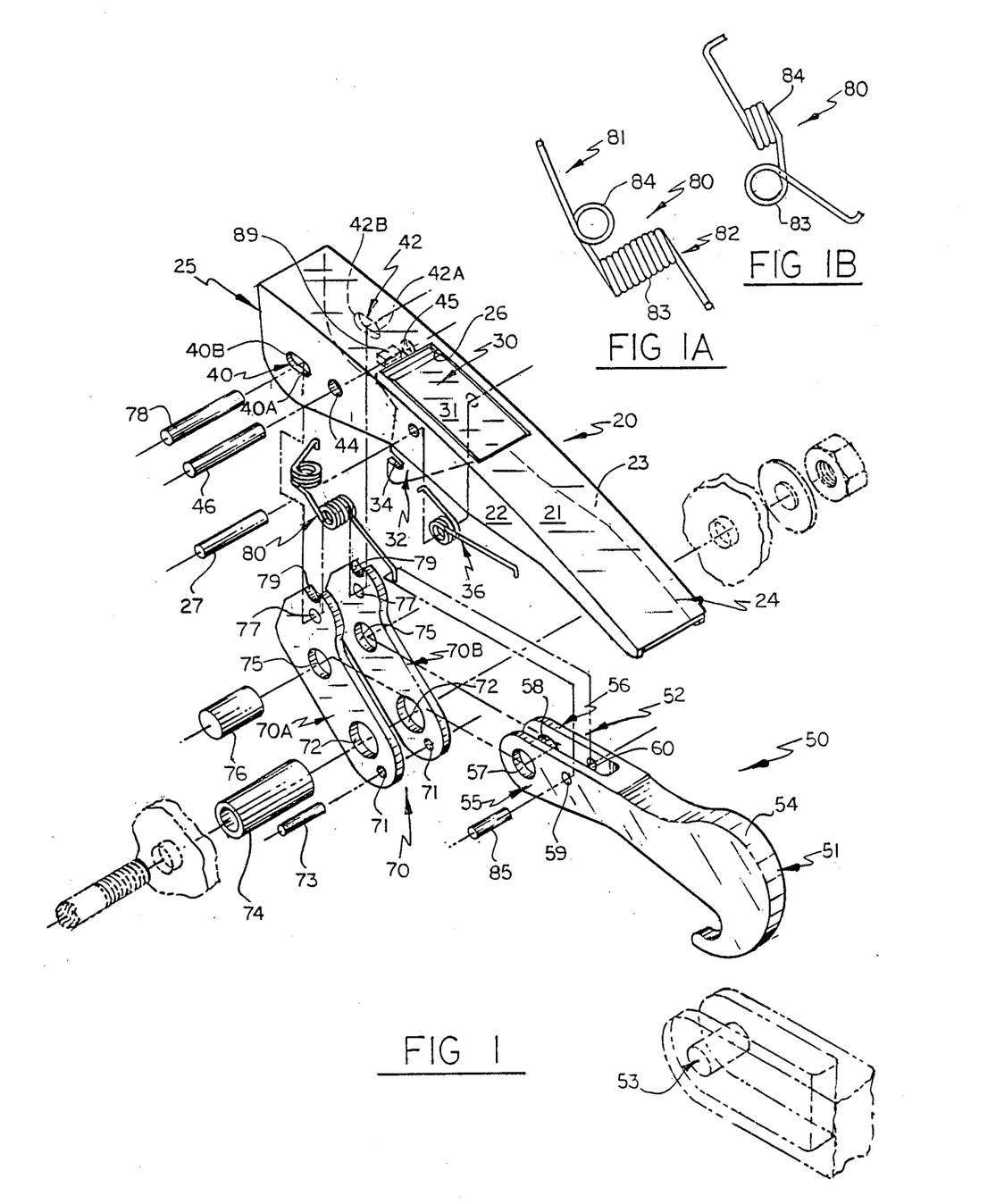
FIG. 1 is an exploded view in perspective of a preferred embodiment of the present tension latch assembly invention.
FIG. 1A is an enlarged top plan view of a spring used in the preferred embodiment.
FIG. 1B is an enlarged side elevational view of the spring shown in FIGS. 1 and 1A.
Figure 2:
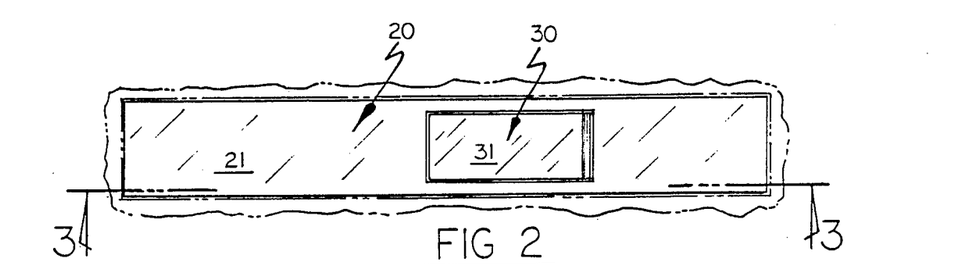
FIG. 2 is a top plan view of the preferred embodiment in a closed condition.
Figure 3:
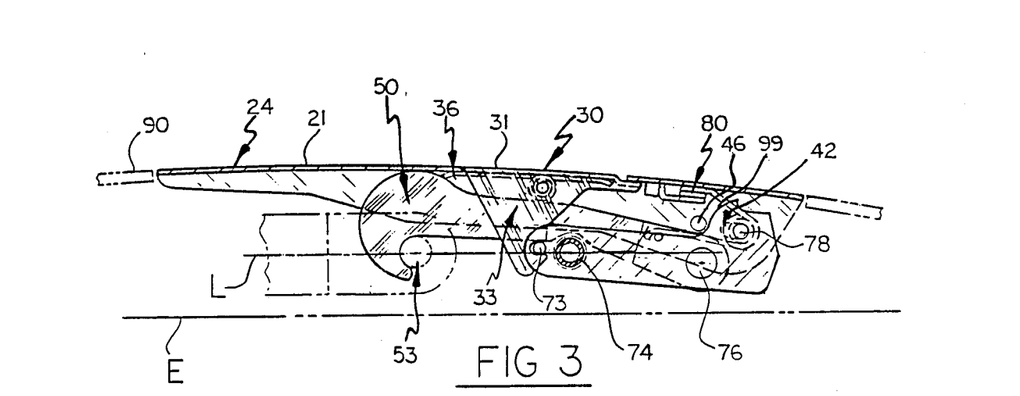
FIG. 3 is a view in cross-section of the preferred embodiment as seen generally along lines 3—3 in FIG. 2.
Figure 4:
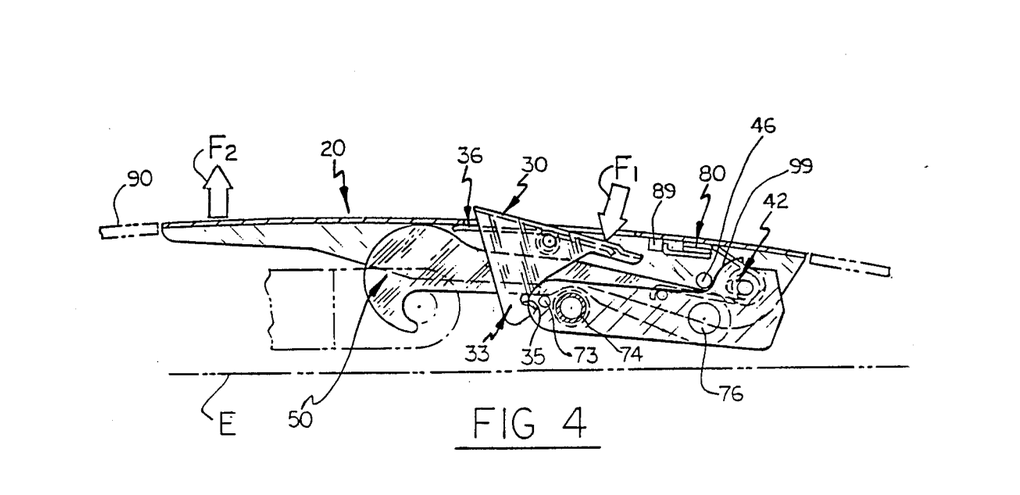
FIG. 4 is a view of what is shown in FIG. 3 as an opening force is exerted on the closed tension latch assembly.

Turning to FIGS. 1, 3 and 4 the basic components of the invention can be appreciated by considering the parts of a preferred embodiment. A handle 20, a keeper engaging member 50, and means for linking the handle 20 with the keeper engaging member 50 form the components of the invention. For a point of reference only words such as forward, rearward, upper and lower are used to assist the reader in orienting the various components with respect to each other. Such references however would not necessarily apply in all applications of the invention, e.g. when an embodiment is mounted so that the handle opens in a direction one-hundred and eighty degrees from the orientation shown in the drawings. Persons skilled in the art will appreciate the likelihood of such varied mountings and thus any further explanation is not believed to be necessary. Also, for the purposes of describing the two embodiments shown in the drawings, the keeper engaging member will hereinafter be termed a hook member.

The handle 20 in the illustrated embodiments has a typical channel-shape construction in that it has a central top or base portion 21 from which extend, opposite each other from either lengthwise edge of the base portion 21, a pair of identical side walls 22, 23. Accordingly the handle has what may be referred to as a forward, first end 24, and a rearward second end 25. A generally centrally located area of the base portion 21 is formed with an opening 26 therein. Mounted in the opening 26 by means of a rivet 27 or like element is a trigger mechanism 30. The particular trigger mechanism 30 shown in the drawings is known in the art in that its uppermost wall 31 lies in flush relationship with the handle base portion 21 when the trigger is in a locked position. Extending from the top wall 31 and substantially parallel to the handle sidewalls 22, 23 are a pair of arms 32, 33. Each arm 32, 33 has at its lowermost portion an indented or notched area forming a hook 34, 35 for capturing therein a portion of an underlying link mechanism to be described further below. A conventional spring 36 is secured with the rivet 27 in a manner such that the trigger mechanism 30 may be pivoted about the rivet 27 when a portion of the trigger wall 31 is depressed.

At the rearward end 25 of the handle 20 a pair of slots 40, 42 are provided, one each in a respective side wall 22, 23. The slots 40, 42 are aligned with respect to each other and have a pre-determined position and size relative to a portion of the link mechanism with which it must cooperate. Each slot 40, 42 has a forward end 40A, 42A respectively and a rearward end 40B, 42B respectively. Forward of each slot 40, 42, is an aperture or through-hole 44, 45 through which a rivet 46 or like element passes and is secured between the two apertures 44, 45.

The hook member 50 has a forward, first end 51 and a rearward, second end 52. The first end 51 has a downwardly extending portion formed as a hook which will engage and capture a keeper 53 shown in phantom in FIG. 1. This end 51 of the hook member 50 is constructed so that when engaged with a keeper 53, there will be substantially little room if any between the top edge 54 of the hook member 50 and the immediately adjacent handle top portion 21.

The rearward or second end 52 of the hook member 50 is formed as a pair of rearwardly extending arms 55, 56. Each arm has a first, rearwardmost through-hole 57, 58 respectively and a second through-hole 59, 60 respectively which is forward of the respective first through-hole 57, 58.

The third basic component of the invention is the means for linking the handle 20 to the hook member 50. A link mechanism 70 in the preferred embodiment comprises a pair of individual links 70A, 70B of identical construction. Each link has a forward, first end and a rearward, second end. In the forward end of each link is an aperture 71. The forwardmost apertures 71 receive a rivet or pin 73. The pin 73 is secured therein so as to extend between the apertures 71 and protrude beyond each link a sufficient distance which will allow the hook portions 34, 35 of the trigger mechanism 30 to be captured by the protruding portions of the pin 73. A second aperture 72 to the rear of the forward aperture 71 on each link 70A, 70B is constructed so as to receive a bushing 74 for mounting the latch hook assembly to a part of the aircraft's structure, shown in phantom. At the rearward, second end of each link 70A, 70B is a second pair of apertures. The forwardmost aperture 75 at the link second end is of a size to receive pivot pin 76 therebetween. The pivot pin 76 pivotally mounts the second end of the hook member 50 to the second end of the link mechanism 70 by an alignment of apertures 57, 58, 75 with the pin 76 being inserted therethrough and securely retained therein. The second pair of apertures 77 at the link mechanism second end are formed in each link 70A, 70B at a position which permits an alignment of the apertures 77 with a respective slot 40, 42 at the handle second end 25. A pivot pin 78 is thus inserted through the aligned apertures 77 and slots 40, 42 to pivotally mount the handle to the link mechanism. The pin 78 may travel in the slot 40, 42 between the slots' two ends. Finally at the upper edge of each link rearward end, adjacent the apertures 77, a detent or camming type surface 79 is formed so as to receive and capture a portion of the pin 78 therein when the handle is indexed into a second position. This feature will be explained further in the operation of the preferred embodiment which follows.

The remaining element in the preferred embodiment is the spring 80 which is provided in order to bias the handle open when the handle 20 is released by the trigger 30 from its locking engagement with the link mechanism 70. The particular spring 80 selected for the preferred embodiment has a unique configuration which may be best appreciated by a study of FIGS. 1A and 1B in conjunction with FIG. 1. The spring 80 has a first coiled end 81 which bears upon a portion of the underside of the handle second end 25 and a bearing block 89 attached thereto. Integrally formed with the first end 81 is a second end 82 whose coiled section 83 is oriented perpendicular with respect to the coiled section 84 of the first end 81. This second end 82 of the spring is positioned so as to bear upon and be secured by a pin 85 which extends between the apertures 59, 60 at the rearward end 52 of the hook member 50. When the latch hook assembly is installed the coiled section 83 of the spring second end 82 surrounds and is secured by the pin 78.

OPERATION OF THE PREFERRED EMBODIMENT

Referring now to FIGS. 2-11, the preferred embodiment in its assembled, operable form may be appreciated. In FIGS. 3-11 the latch hook assembly is shown as it would appear in cross-section at various degrees of release and locking.

In FIG. 3 the hook member 50 is shown in full load engagement with the keeper 53 of the keeper assembly.

The handle is shown in its closed position and is locked to the link mechanism pin 73 by the trigger 30. Both the trigger wall 31 and the handle top portion 21 lie flush with the surface 90 (shown in phantom) of the aircraft structure in which the invention is mounted. From FIG. 3 the low-profile envelope in which the invention must operate is shown in phantom lines, E. Particular attention should be paid to the location of the latch hook assembly with respect to the envelope throughout FIGS. 3-11. In FIG. 3 it can also be seen that the primary load line L of the assembly is defined by a plane which passes through the center of the keeper 53 and the center of the mounting bushing 74. The pivot pin 76 by which the hook member 50 is secured to the link mechanism 70 lies in an area below the load line. Any additional tension load applied along the load line will tend to close the latch, accordingly the latch is over-center.

To open the handle 20, without releasing the hook member 50, a force $F_1$, is exerted on the trigger 30 as shown in FIG. 4. A force sufficient to depress and thus overcome the biasing spring 36 is required to pivot the trigger hook portion 35 away from the pin 73 and thus release the handle so that it may be freely rotated open either manually or by the biasing force $F_2$ of the spring 80.

Figure 5:
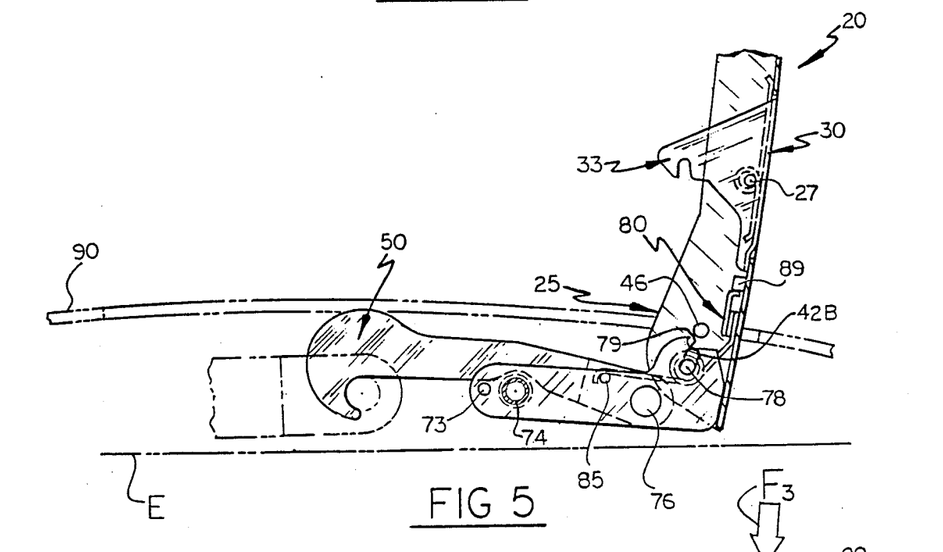
FIG. 5 is a view of what is shown in FIGS. 3 and 4 when the handle of the preferred embodiment is in the open position.
Figure 6:
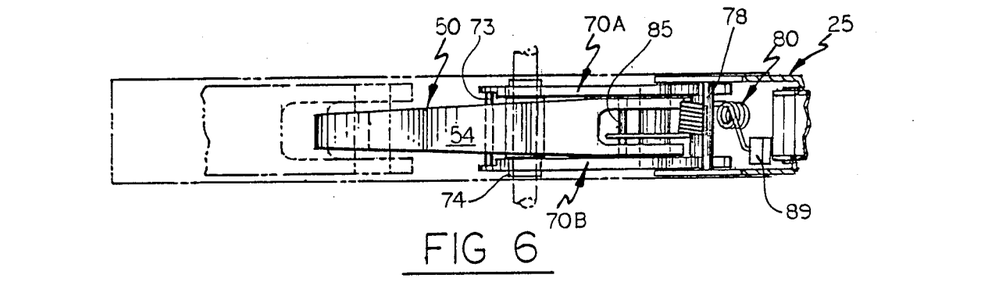
FIG. 6 is a top plan view of what is shown in FIG. 5.
Figure 7:
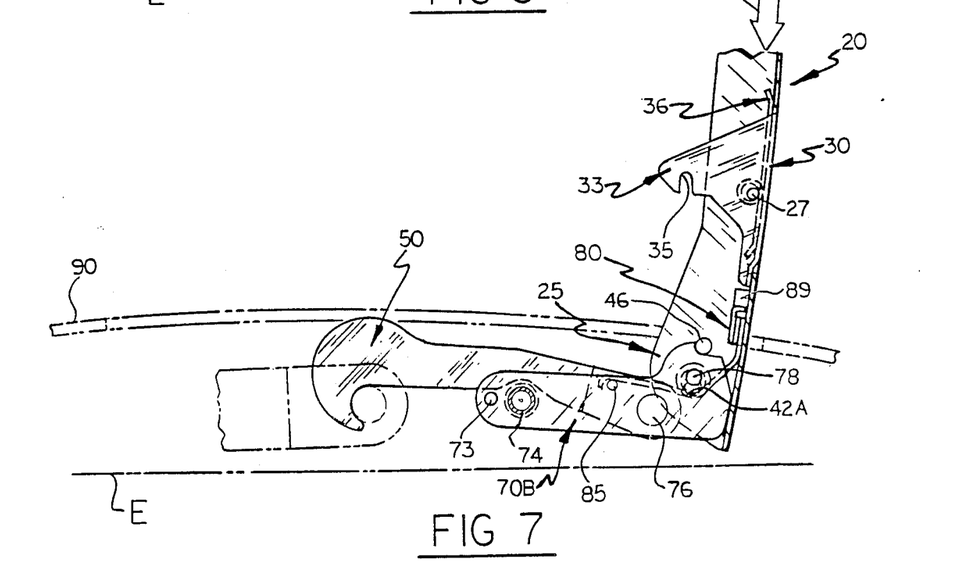
FIG. 7 is a cross-sectional view of the preferred embodiment under forces causing the handle and link mechanism to engage for simultaneous movement for release of the keeper engaging member from the keeper assembly.

After the handle has rotated to a first or open position the latch hook assembly will still be under load with the keeper assembly as shown in FIGS. 5 and 6. It should be noted that the handle opens approximately ninety degrees, unlike handles of prior art latches which generally open no more than fifteen degrees. At this time the assembly may be inspected, adjusted or otherwise attended to without requiring release of the hook member from the keeper 53. In FIG. 5 it can be seen that the pin 78 is positioned in the rearward end 40B, 42B of the slots 40, 42 when the handle is in a first position.

To release the hook member 50 from the keeper assembly 53, the operator must index the handle into a second position from that which is shown in FIG. 5, in order to cause the link 70, and hence the hook member 50, to move forward when the handle 20 is rotated. To index the handle into the second position the operator exerts a force, $F_3$, on the handle 20 in a direction towards the link mechanism second end 25. The force $F_3$ must be sufficient to overcome the biasing force of the spring 80 and move the handle such that the pin 78 is displaced with respect to the slots, i.e. from its initial position into a second position at the forward ends 40A, 42A of the slots 40, 42. When this occurs, the pin 46 moves downwardly and is positioned for capture by the detents 79 on the links 70A, 70B.

Figure 8:
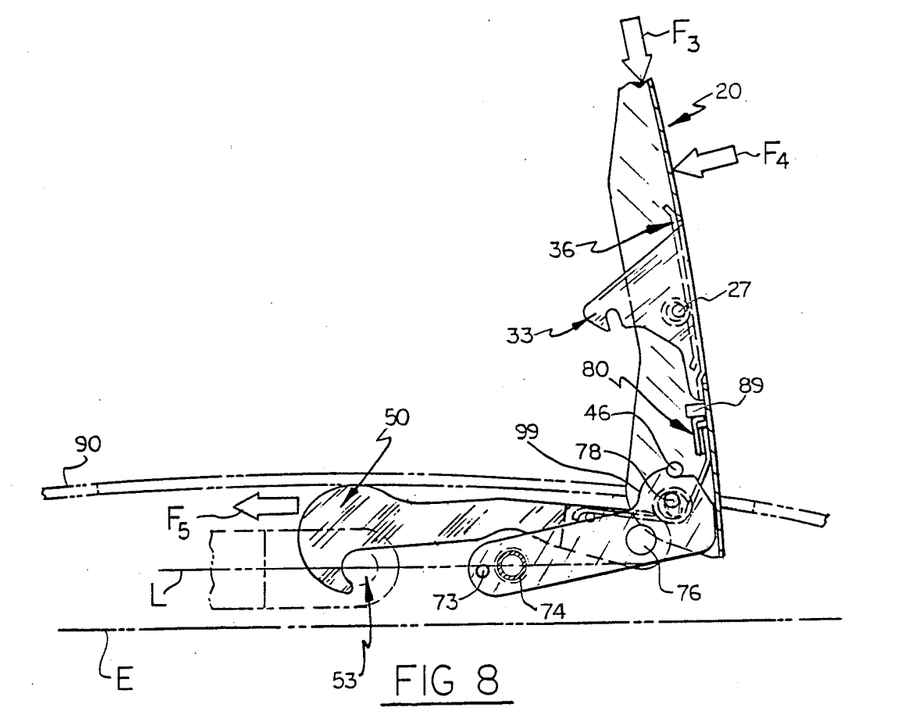
FIG. 8 is a view of what is shown in FIG. 7 as the handle and link mechanism are moved to release the keeper engaging member.

After the indexing has been accomplished and while the handle is being maintained in its second position by a force $F_3$ the handle is rotated as indicated by the arrow $F_4$ shown in FIG. 8. Because the pin 46 is captured by the detents 79 and the pin 78 is positioned in the forward ends of the slots 40, 42, the handle 20 is mechanically linked with the link mechanism 70. Thus any forwardly directed force exerted upon the handle 20 will be transferred through the link mechanism 70 and hence to the hook member 50. The pivot pin 76 is thus brought over the center or load-line L. The hook member 50, as it moves forward as indicated by the arrow $F_5$ in FIG. 8, is released from the keeper assembly and is unlatched allowing the operator to access the interior of the aircraft structure.

Figure 9:
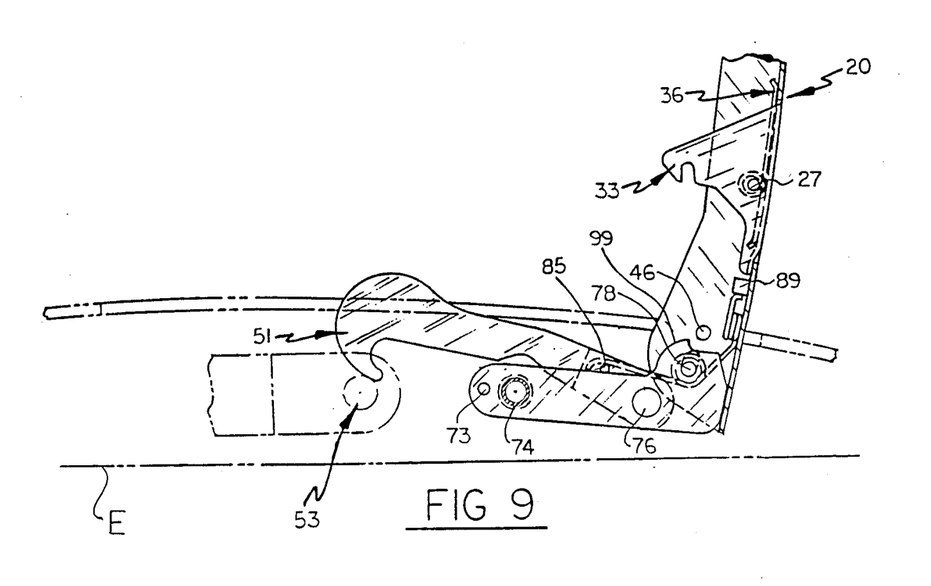
FIG. 9 is a view of what is shown in FIGS. 5-8 of the tension latch assembly in its open and released positions.

When the hook member 50 is released from the keeper assembly, the handle rotation may be reversed once again. In its unlatched position the hook member may rest on the mounting bushing 74 or the keeper 53, and the spring 30 returns the handle to its first position with the pin 46 free from capture by the link detents 79. The pin 78 is returned to a position at the rearward ends of the slots 40, 42 once again. FIG. 9 illustrates this condition.

Figure 10:
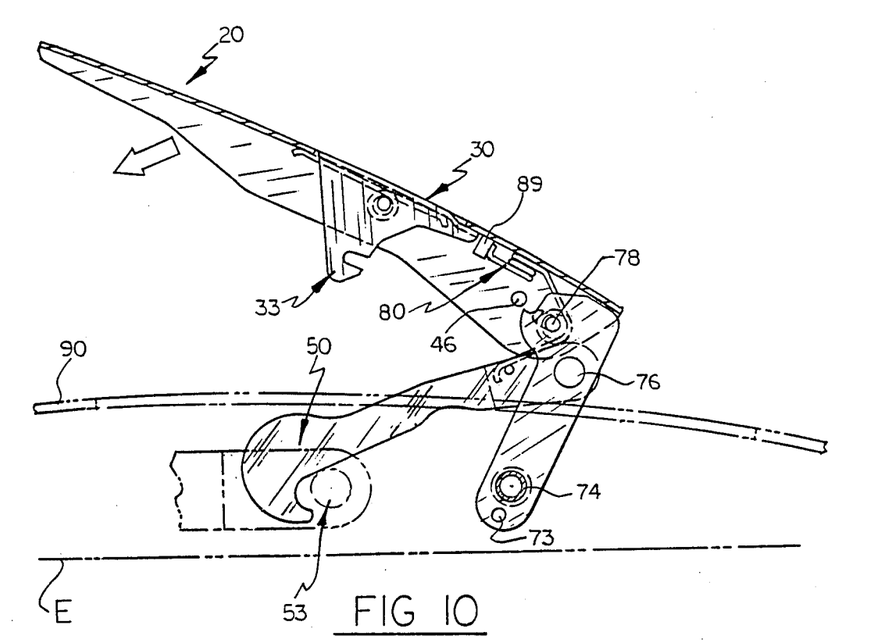
FIG. 10 is a view of the preferred embodiment as the keeper engaging member is moved into position for securement with the keeper assembly.
Figure 11:
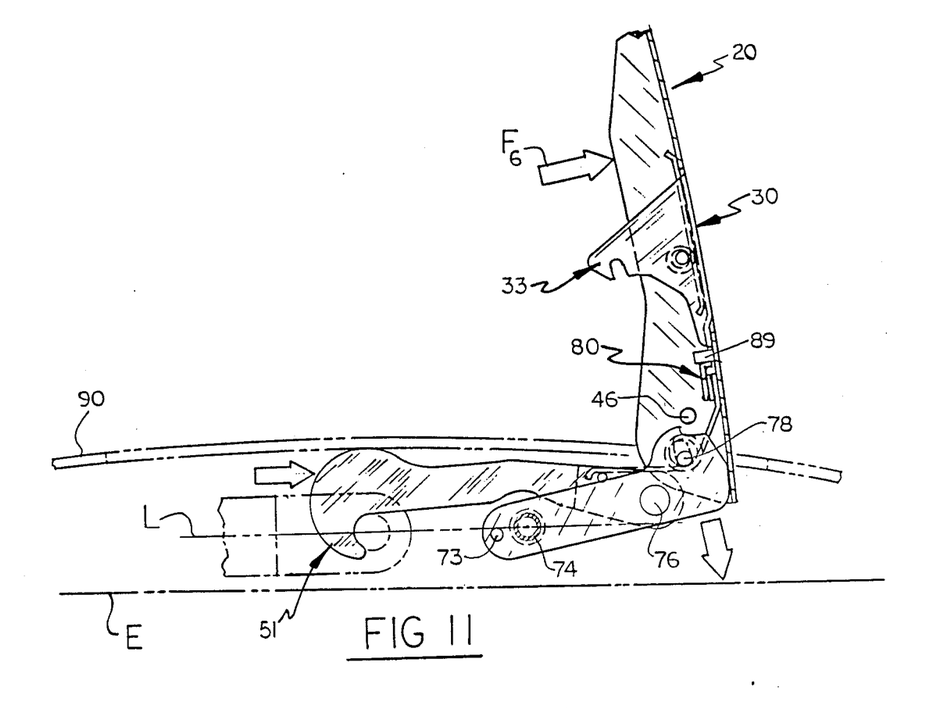
FIG. 11 is a view of the preferred embodiment subsequent to the movement illustrated in FIG. 10.

To re-latch the hook assembly with the keeper assembly the operator need merely rotate the handle forward as shown in FIG. 10. The pivot connections made possible via pins 78 and 76 are sufficient to bring the hook member 50 foward with the handle 20. Because there are no load forces which must be overcome, indexing of the handle, as required for the release of the hook member 50, is not necessary for the relatching of the assembly. When the hook member 50 is again positioned forward of the keeper 53 as shown in FIG. 10, the handle is then rotated in a rearward direction by a force $F_6$ causing the hook member to engage the keeper. The pivot 76 is moved rearwardly and downward by the handle movement until it passes over the center or load line L. See FIG. 11. When this occurs the latch assembly is again secured under a load as shown in FIG. 5. The handle may be pushed forward and locked by the trigger 30 with the link mechanism pin 73.

DESCRIPTION OF AN ALTERNATE EMBODIMENT

Figure 12:
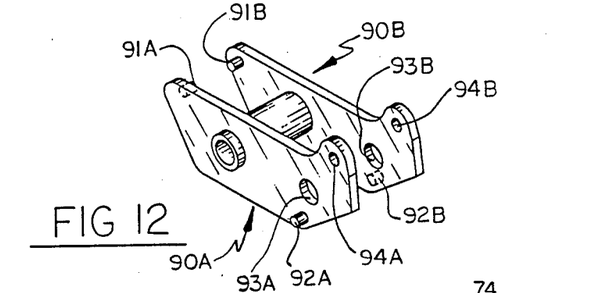
FIG. 12 is a perspective view of a link mechanism of an alternate embodiment of the present tension latch assembly invention.

FIGS. 12-17 illustrate an alternate embodiment of the present invention. In this embodiment the link mechanism 70 and the handle 20 are constructed in a manner which may be described as being the reverse of that for the preferred embodiment. In FIG. 12 it can be seen that a pair of identical links 90A, 90B have at their respective forward ends a pin 91A, 91B respectively which protrude a short distance from the link's side wall in a direction towards the other pin. The pins 91A, 91B are not formed as a continuous pin in order to permit the hook member to pass therebetween as shown in FIGS. 13-17. At the rearward ends of each link 90A, 90B a second pair of pins 92A, 92B protrude from each link's lowermost area in a direction opposite from each other. An aperture 93A, 93B is provided at the rearward end of each link 90A, 90B for the pivot pin 76 to pass therethrough. At the uppermost area of the link rearward ends a second aperture or through-hole 94A, 94B is provided. The pin 78 extends through these apertures 94A, 94B.

The handle 20 differs from that of the preferred embodiment in that the rearwardmost edge end of the handle 20 is formed so as to have two contiguous arcuate surfaces 95, 96, each of which provides at one end thereof a detent 97, 98 respectively.

The trigger mechanism 30 is re-oriented so that its hook portion faces in a forward direction rather than rearwardly as in the preferred embodiment. In all other respects the alternate embodiment is constructed identical to the preferred embodiment.

Figure 13:
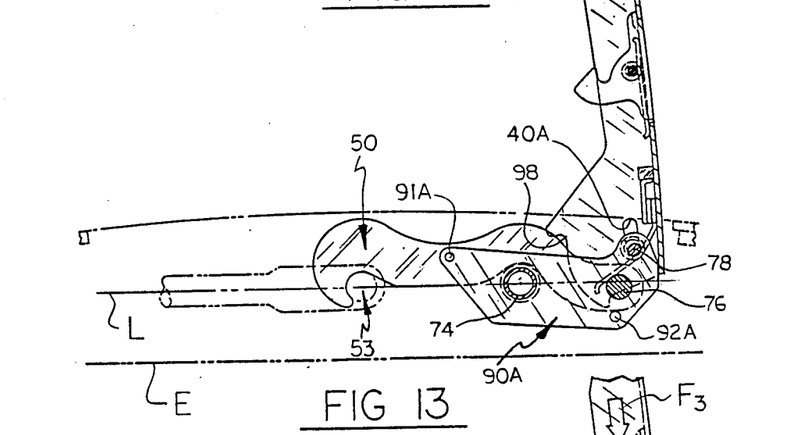
FIG. 13 is a view in cross-section of the alternate embodiment in a position comparable to what is shown for the preferred embodiment in FIG. 5.
Figure 14:
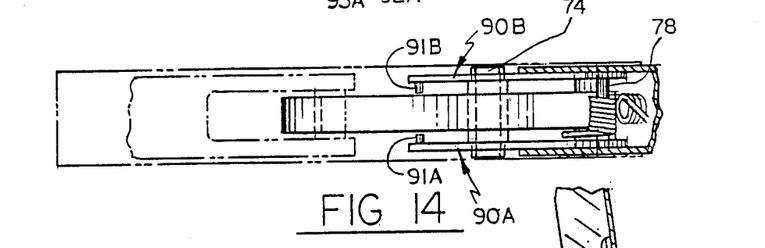
FIG. 14 is a top plan view of what is shown in FIG. 13.
Figure 15:
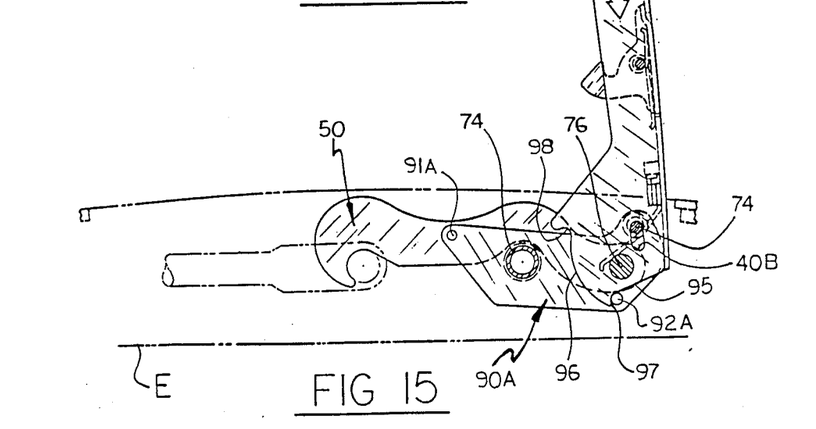
FIG. 15 is a view of the alternate embodiment in FIG. 13 as it would appear in a position comparable to what is shown in FIG. 7.

In FIGS. 13 and 14 the alternate embodiment is shown with the handle open and the hook member 50 secured with the keeper 53. Note in FIG. 13 that the pin 78 is once again in the rearward ends 40B, 42B of the slots 40, 42. To release the hook member and thus separate the hook assembly from the keeper assembly, the force $F_3$ is exerted upon the handle in a direction towards the link mechanism second end as shown in FIG. 15. This force causes the handle to move downwardly until the pin 78 is abutting the forward ends 40A, 42A of the slots 40, 42 and the first detents 97 are positioned upon a respective link pin 92A, 92B.

When the indexing of the handle 20, into its second position is accomplished and the force $F_3$ is maintained on the handle, the handle is rotated forward. Again, due to the indexing of the handle into its second position, the link mechanism and handle move as one system to carry the hook member to a position forward and apart from the keeper 53 and thereby release it from capture. In this process the pivot 76 is brought over-the-center with respect to the load-line.

Figure 16:
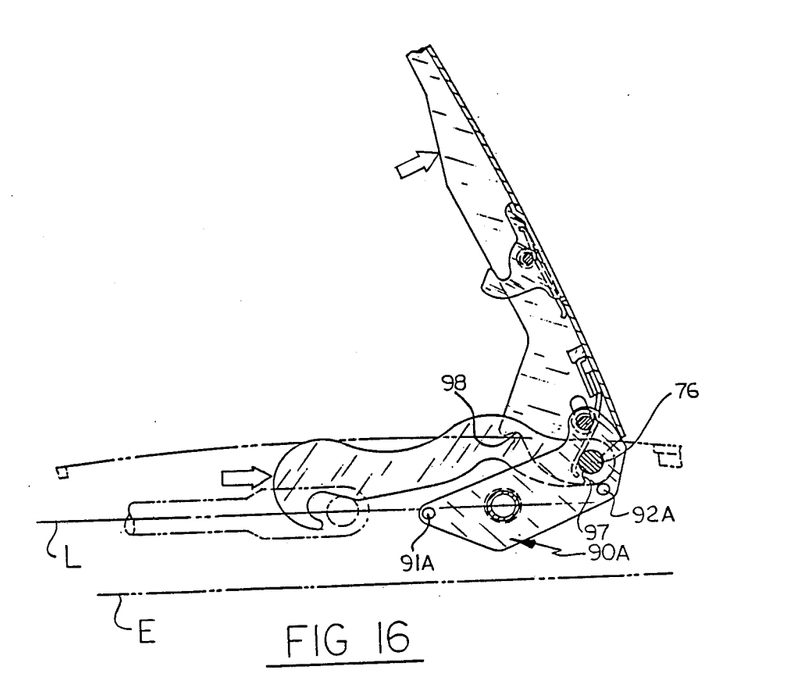
FIG. 16 is a view of what is shown in FIG. 15 as the handle is rotated to engage the keeper assembly member with the keeper assembly.

To recapture the hook member and thereby bring the latch under load once again the handle in its first position is merely rotated foward in order to place the hook member over and in front of the keeper as shown in FIG. 16. A capture of the link pins 92A, 92B by the handle detents 97 is not required to accomplish the relatching, just as in the preferred embodiment the capture of the pin 46 by the link detents 79 was not required. Neither is the handle required to be in its indexed second position.

Figure 17:
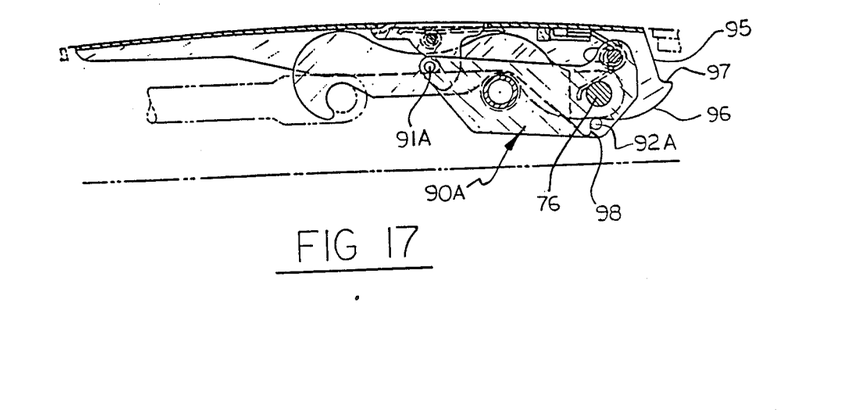
FIG. 17 is a view in cross-section of the alternate embodiment as it would appear in a fully closed and locked condition.

In its closed and locked position the alternate embodiment appears as shown in FIG. 17.

It will be appreciated from a comparison of the construction of the link mechanisms and the handles for the two embodiments that both embodiments have a means for engaging the handle with the link mechanism which includes two basic parts: (1) means on the handle for indexing the handle alternately between a first and a second position relative to the link mechanism, including a slot and a rigid member, i.e. the pin 46 in the preferred embodiment and the arcuate surface 95 and detent 97 in the alternate embodiment and (2) means on the link mechanism for engaging the rigid member when the handle is in the second position, i.e. the detents 79 in the preferred embodiment and the pins 92A, 92B in the alternate embodiment. With both embodiments the result is the same in that when the handle is in the second position movement of the handle causes simultaneous movement of the link mechanism.

It should be noted in FIGS. 3 and 17, the handle in its closed position is prevented from any undesirable rearward movement which might otherwise cause an inadvertent opening of the latch. The mechanism for preventing such movement in the preferred embodiment is the abutment of the pin 46 with the adjacent end edge 99 of the link mechanism located rearward of the pin 46. In the alternate embodiment this mechanism is provided by the abutment of the detents 98 against the pins 92A, 92B.

In view of the foregoing descriptions of two embodiments the unique features of the present invention may be summarized: (1) The trigger mechanism locks to the link mechanism at a location forward of the mounting bushing. In the prior art the trigger is typically secured to the keeper engaging member. (2) The unique locking of the handle (via the trigger mechanism) to the link mechanism effectively traps the keeper engaging member securely within a space defined between and by the handle and the link mechanism. This arrangement prevents the latch from going overcenter when acted upon by vibrational forces. (3) The particular construction of the handle and link mechanism second ends allows the handle to be indexed into a second position for simultaneous movement of the handle and link mechanism as a unitary structure in order to release the keeper engaging member from the keeper assembly. (4) The keeper engaging member configuration is such as to place it in close proximity with the adjacent handle top portion when the latch is in its closed position, an important feature in preventing the latch from inadvertently going out of toggle as a result of vibrational forces. (5) Also, the handle opens fully to allow complete access while the keeper engaging member is under load. In contrast the prior art opens less fully allowing only limited access.

The present invention affords a number of advantages in one unique design which are not provided by any prior art latch. To persons skilled in the art modifications of certain elements of the embodiments may be possible without departing from the spirit of the invention. Accordingly the invention is believed limited only by the scope of the claims which follow.

What is claimed is:

1. A low profile, over-center tension latch assembly constructed for aerodynamic flush-mounting and cooperation with a keeper assembly to draw two bodies together and secure the bodies in rigid relationship, said tension latch assembly comprising:

a handle having a forward, first end and a rearward, second end;

a keeper engaging member having a forward, first end formed so as to engage a keeper assembly, and a rearward, second end opposite said first end;

means for linking said handle to said keeper engaging member, said linking means including a link mechanism having a forward, first end and a rearward, second end, spring means for biasing said handle, means for engaging said handle with said link mechanism such that movement of said handle causes simultaneous movement of said link mechanism, means for pivotally mounting said keeper engaging member second end to said link mechanism second end, and means for pivotally mounting said handle second end to said link mechanism second end, a portion of said link mechanism being adapted for attachment to a mounting located on one of the two bodies; and means, pivotally mounted on said handle and projecting towards said link mechanism, for locking said handle to said link mechanism when said keeper engaging member is engaged with the keeper assembly;

said means for locking said handle to said link mechanism including a locking element on said link mechanism first end, forward of the mounting, said locking element being constructed to temporarily engage and removably secure a portion of said handle locking means, such that said handle locking means is maintained in an aerodynamically flush relationship with said handle, and said handle is locked to said link mechanism in a position opposing said handle spring means bias.

2. The tension latch assembly of claim 1 wherein said keeper engaging member is constructed and arranged in closed spatial relationship with said handle when said handle is locked to said link mechanism such that movement of said keeper engaging member in a direction normal to said handle is restricted.

3. A low profile, over-center tension latch assembly constructed for aerodynamic flush-mounting and cooperation with a keeper assembly to draw two bodies together and secure the bodies in rigid relationship, said tension latch assembly comprising:

a handle having a forward, first end and a rearward, second end;

a keeper engaging member having a forward, first end formed so as to engage a keeper assembly, and a rearward, second end opposite said first end;

means for linking said handle to said keeper engaging member, said linking means including a link mechanism having a forward, first end and a rearward, second end, spring means for biasing said handle, means for engaging said handle with said link mechanism such that movement of said handle causes simultaneous movement of said link mechanism, means for pivotally mounting said keeper engaging member second end to said link mechanism second end, and means for pivotally mounting said handle second end to said link mechanism second end, a portion of said link mechanism being adapted for attachment to a mounting located on one of the two bodies; and means, pivotally mounted on said handle and projecting towards said link mechanism, for locking said handle to said link mechanism when said keeper engaging member is engaged with the keeper assembly;

said means for locking said handle to said link mechanism including a locking element on said link mechanism first end, forward of the mounting, said locking element being constructed to temporarily engage and removably secure a portion of said handle locking means, such that said handle locking means is maintained in an aerodynamically flush relationship with said handle, and said handle is locked to said link mechanism in a position opposing said handle spring means bias;

said keeper engaging member being constructed and arranged in close spatial relationship with said handle when said handle is locked to said link mechanism such that movement of said keeper engaging member in a direction normal to said handle is restricted.

* * * * *